(No Model.)
W. H. MULLINS.
BAKING PAN.
No. 563,675. Patented July 7, 1896.
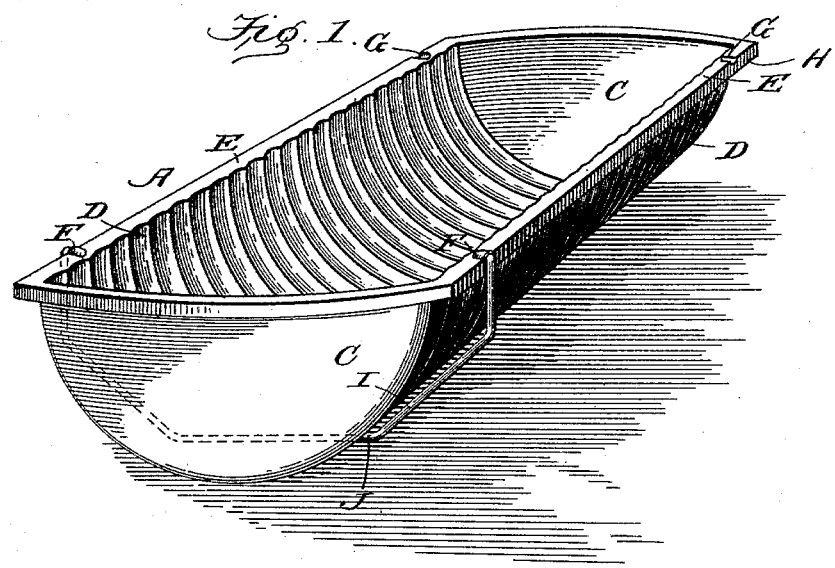
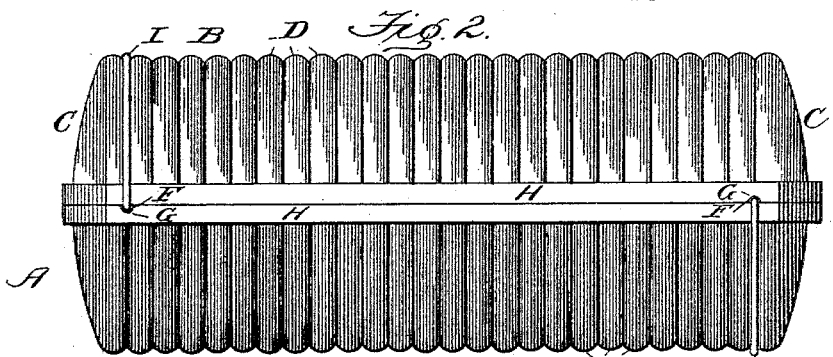
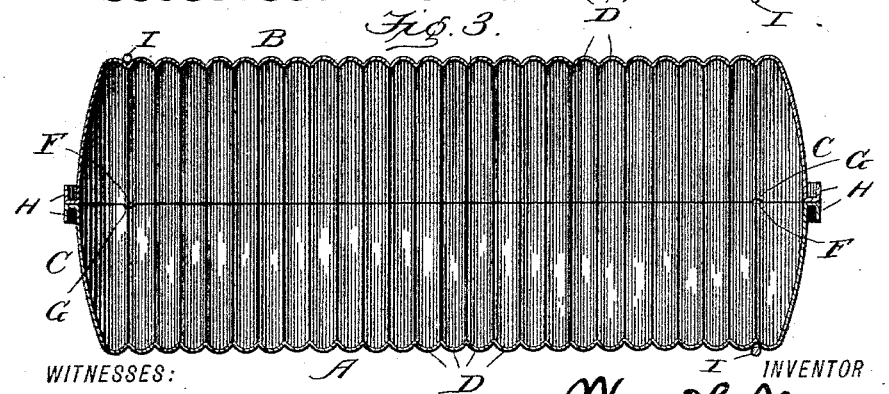
WITNESSES:
Edwin L. Bradford
H. J. Woodhull
INVENTOR
Wm. H. Mullins,
BY Wm. O. Dyre.
ATTORNEY

UNITED STATES PATENT OFFICE.

WILLIAM H. MULLINS, OF SALEM, OHIO.

BAKING-PAN.

SPECIFICATION forming part of Letters Patent No. 563,675, dated July 7, 1896.

Application filed December 31, 1895. Serial No. 573,938. (No model.)

*To all whom it may concern:*

Be it known that I, WILLIAM H. MULLINS, a citizen of the United States, residing at Salem, in the county of Columbiana and State of Ohio, have invented certain new and useful Improvements in Baking-Pans; and I do hereby declare the following to be a full, clear, and exact description of the invention, such as will enable others skilled in the art to which it appertains to make and use the same.

My invention relates to culinary utensils, and has particular reference to baking-pans constructed upon the general principles embodied in United States Letters Patent No. 313,092, granted March 3, 1885, and at present owned by me.

The object of my improvements is the production of a pan numbering among its characteristic features simplicity of construction, lightness, durability, also effectiveness in use, especially as a baker of bread, and combining therewith the no less desirable quality of producing a maximum amount of crust upon a loaf of given size.

As a further object my invention contemplates and includes duplicate pans of semicylindrical form configured by a series of transverse corrugations and adapted to be used independently or together for the purpose of producing a semicylindrical or a cylindrical loaf, as the case may be, which is conversely corrugated upon its surface.

The invention will be hereinafter described, and particularly pointed out in the claims following.

In the accompanying drawings, which form part of this specification, and whereon similar reference-letters indicate like parts wherever employed, Figure 1 is a perspective view of a single-pan section, showing a pivotally-attached support therefor, partly in dotted lines. Fig. 2 represents in side elevation the complete or double pan for producing a cylindrical loaf; and Fig. 3 is a vertical central section of the invention, taken through the longitudinal center of Fig. 2.

Reference being had to the drawings and letters thereon, A indicates the body of the pan, and B its top or cover, each stamped from single pieces of sheet metal in trough or semicylindrical shape with closed ends C C, and configured by a series of transverse indentations D, combining to form continuous circular corrugations or depressions, as shown. The ends C C may also be configured, if desired, by an appropriate emblem or ornamentation to relieve them of their plainness.

The meeting or horizontal faces E of both pans A and B are plain surfaces, except for oppositely-disposed lugs F and depressions G stamped thereon, while at this point in each pan the structure is surrounded and reinforced by a downwardly-extending flange H of the metal. In each of the lugs F is journaled a swinging bail I having angular projecting sides and a flat horizontal shoe J, adapted to perform the double function of interlocking the pans and supporting them when in use.

It will be noted that a complete pan or set of pans thus constructed contemplates two corresponding sections A and B, each provided with a bail I, pivoted upon opposite sides thereof near its end. This bail I is preferably angular in form, as illustrated by Fig. 1, its projecting angular sides presenting a convenient means of swinging same upon its pivots—particularly when hot—and is of spring metal to facilitate its engagement and coaction with the corrugations D, as will later appear.

This being substantially a description of my invention, its use is as follows: A baking of dough having been placed in the pan A to a level of the edges or horizontal face E thereof immediately conforms its contacting-surfaces to the interior or transversely-corrugated shape of the pan. Bail I is then swung upon its pivots until the horizontal portion or shoe J rests beneath the pan in one of the corrugations or depressions D, where it is retained by its inherent resiliency and serves to support the pan in an upright position during the process of baking. By this arrangement it is apparent that, at most, the pan can only have direct contact with the oven throughout its longitudinal center at the extreme lowermost points of the corrugations D, and, as a matter of fact, the shoe J of bail I, when introduced beneath one end of the pan, elevates such end a distance equal to the diameter or thickness of the bail. The effect of such support for the pan A results most advantageously to the baking and serves to insure a superior crusting of the loaf upon all sides. Being desired to produce a full cylindrical loaf it is only necessary to supply pan A more liberally with dough and inclose same by the cover or duplicate pan B. In this arrangement the lugs F on one pan engage depressions G on the other and insure complete registration of the transverse corrugations D, which combine to encircle the entire surface of the double pan. The pan A and its cover B are then firmly secured together by means of the swinging bails I, that pivoted upon the pan A being passed over the end of cover B, and that pivoted upon cover B being in like manner passed over the end of pan A, the latter serving the additional function of supporting the utensil in the manner heretofore described. It will now be seen that the resiliency of bails I permits each to sping into one of the corrugations D and interlock therewith, the same resiliency also rendering possible a further advancement of the bails over several such corrugations, as over a ratchet-bar or rack when desired, for the purpose of drawing and retaining the pan-sections in closer contact. A baking having been thus effected in a single or a double pan, the resulting loaf will be configured by a series of parallel transverse corrugations dividing the loaf upon its surface into as many equal divisions, which may be utilized to indicate points of cutting or slicing the loaf, or of dividing it into equal portions of greater size.

This being substantially the invention, what I claim, and desire to secure by Letters Patent, is—

1. A sheet-metal baking-pan bearing a series of transverse corrugations or projections, in combination with a supporting-bail adapted to interlock with said corrugations or projections, substantially as described.

2. A sheet-metal baking-pan bearing a series of transverse corrugations or projections, in combination with a swinging supporting-bail pivoted upon opposite sides thereof and adapted to interlock with said corrugations or projections substantially as described.

3. A semicylindrical baking-pan bearing a series of transverse corrugations or projections, in combination with a swinging supporting-bail pivoted thereon having a horizontal foot for interlocking with said corrugations or projections, substantially as described.

4. A semicylindrical baking-pan bearing a series of transverse corrugations or projections, in combination with a swinging supporting-bail having projecting angular sides and a horizontal foot for interlocking with said corrugations or projections, substantially as described.

5. A baking-pan formed of two corresponding and interchangeable sections one provided with a bail adapted to swing over the other and interlock the two, substantially as described.

6. A baking-pan formed of two corresponding and interchangeable sections each provided with a bail adapted to swing over the other and interlock the two, substantially as described.

7. A baking-pan formed of two corresponding sections each bearing a series of transverse corrugations or projections, in combination with a bail pivoted upon each section adapted to engage said corrugations of the other section and interlock the two, substantially as described.

8. A cylindrical baking-pan formed of two corresponding sections surrounded by a series of transverse corrugations or projections, in combination with lugs and depressions upon the meeting surfaces of said sections to insure registration, and a swinging bail upon each section for engaging the corrugations of its adjacent section and interlocking the two, substantially as described.

9. A cylindrical baking-pan formed of two corresponding sections bearing a series of transverse corrugations or projections, in combination with a reinforcing-flange on each pan-section, and interlocking bails pivoted between the flanges for engaging said corrugations, substantially as described.

In testimony whereof I subscribe my signature in presence of two witnesses.

WILLIAM H. MULLINS.

Witnesses:
JOHN R. FARNUM,
WM. E. DYRE.